LOCK FOR TELEPHONE RECEPTACLE

Filed Aug. 5, 1965

INVENTOR.
ROBERT D. BARR

BY M. Jabin

ATTORNEY

United States Patent Office 3,343,384

Patented Sept. 26, 1967

3,343,384

LOCK FOR TELEPHONE RECEPTACLE

Robert D. Barr, 5945 Cloverly Ave., Temple City, Calif. 91780

Filed Aug. 5, 1965, Ser. No. 477,479
2 Claims. (Cl. 70—159)

ABSTRACT OF THE DISCLOSURE

A locking device for controlling access to telephone receptacles is provided by the present disclosure. A shutter which is pivoted by a lock cylinder when a key is inserted in the lock and turned, can be positioned in front of a telephone jack, so as to obstruct access thereto and prevent an unauthorized person from plugging his telephone into the jack.

When a tenant in an apartment house with a pool desires to take a dip in the pool, he often finds that if his telephone should ring in his apartment while he is in or about the pool, it becomes necessary for him to dash back to his apartment. In order to avoid the necessity of dashing back to his apartment when his telephone rings, it is becoming popular for apartment house owners to provide a separate telephone jack for each tenant at the side of the pool.

When such conveniences are made available, the tenant takes his telephone with him when he goes to the pool. The telephone is provided with a male plug, and the tenant simply plugs his telephone into his pool-side jack. If his telephone should ring while he is in or near the pool, he can take the call right there on his own telephone.

The problem is for the tenant to be able to lock his own pool-side jack, so that an unauthorized person cannot plug in and make a telephone call on his line. If the jack is not locked when the tenant is not present, an unauthorized person could plug into the tenant's pool-side jack and make long-distance telephone calls which would be charged to the tenant's telephone number.

It is an object of the present invention, therefore, to provide a novel locking device.

It is another object of the present invention to provide a lock for a telephone jack.

It is still another object of the present invention to provide a lock for a telephone jack such that persons will be unable to plug their own telephones into someone else's telephone jack and thereby make unauthorized telephone calls.

According to the present invention, a lock for a telephone jack comprises a jack cover or shutter which is positioned between the jack and a window in a front panel and which is pivoted by the lock cylinder when a key is inserted in the lock and turned.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2, 3, 4, 5:
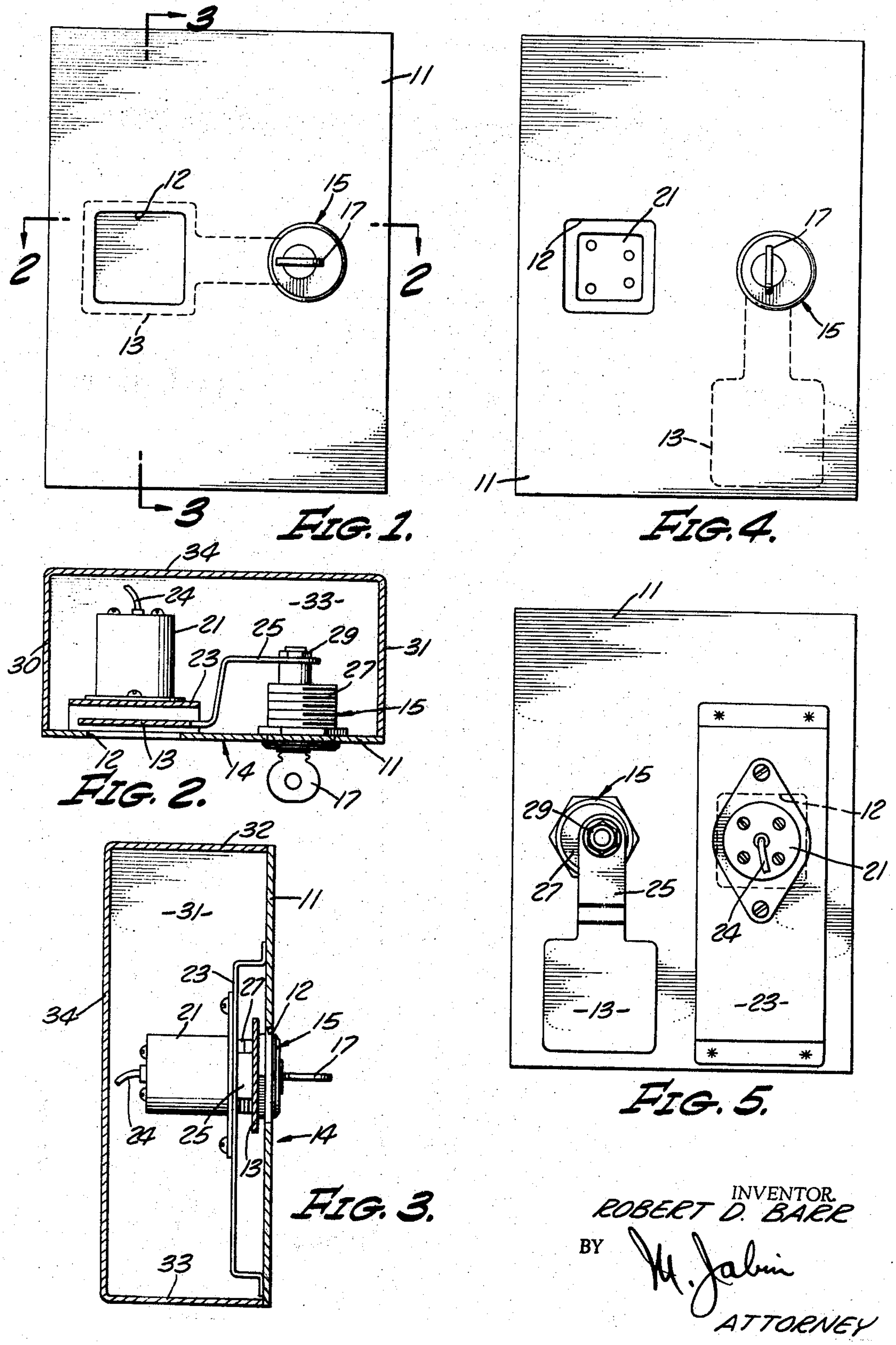
FIGURE 1 is a front view of a lock for a telephone jack according to the present invention, in its locked condition.
FIGURE 2 is a sectional view taken along the line 2—2 of FIGURE 1.
FIGURE 3 is a sectional view taken along the line 3—3 of FIGURE 1.
FIGURE 4 is a front view of the locking device shown in FIGURE 1, but in its unlocked condition.
FIGURE 5 is a rear view of the locking device shown in FIGURE 4.

Turning now to the drawings, FIGURES 1–3 show front panel 11 having jack window or opening 12 therein. Window 12 is obstructed from within by jack cover or shutter 13. Panel 11 encloses compartment 14 and contains lock 15 mounted thereon. Key 17 operates lock 15 and is shown inserted therein.

FIGURES 2 and 3 show telephone jack 21 mounted upon jack support 23, which is bolted to the rear surface of panel 11. Support 23 is somewhat U-shaped so as to support jack 21 spacially away from panel 11, but in alignment with window 12. Telephone cable 24 is wired to jack 21. Shutter 13 is positioned between jack 21 and window 12 in front panel 11. One end 25 of shutter 13 is bolted to cylinder 27 of lock 15 by nut 29.

FIGURE 4 shows the same locking device as the view shown in FIGURE 1, except that key 17 has been turned, thereby pivoting shutter 13 away from window 12 and exposing telephone jack 21 therethrough. Jack 21 is shown as a female receptacle by way of example only, and could also be a male receptacle.

FIGURE 5 is a rear view of the locking device showing shutter 13 pivoted away from the jack window, as in FIGURE 4. Side panels 30 and 31, top panel 32, bottom panel 33, and rear panel 34 of compartment 14 have been omitted for clarity. The operation of the locking device will now be described.

When the tenant or other person entitled to use the telephone jack 21 within compartment 14, desires to use jack 21, he inserts key 17 into lock 15 and turns key 17, which causes cylinder 27 to rotate, thereby pivoting shutter 13 away from window 12, as shown in FIGURES 4 and 5. The locking device is then in its unlocked condition, and access to telephone jack 21 can readily be had through window 12 in front panel 11, as shown in FIGURE 4. The telephone plug can thus be conveniently inserted through window 12 and plugged into jack 21. The tenant or other authorized person can then relax at the pool side and answer incoming or make outgoing telephone calls at his convenience.

When the tenant or other authorized person desires to leave the pool side, he simply pulls his telephone plug out of jack 21 and turns key 17, which pivots jack cover or shutter 13 between jack 21 and front panel 11, as shown in FIGURES 1–3, thereby preventing access to jack 21 through window 12. With the locking device in its locked condition, the tenant can leave the pool side with his telephone and key, secure in the knowledge that no unauthorized person will be able to make telephone calls on his line.

If preferred, shutter 13 could be connected to cylinder 27 in other ways, for example eccentrically or by means of a cam, so that when key 17 is turned, shutter 13 would slide back and forth horizontally, instead of pivoting. Thus, in FIGURE 2, if the turning of key 17 caused shutter 13 to slide linearly, jack 21 would be exposed through window 12 if shutter 13 were caused to slide towards the right.

While particular embodiments of the present invention have been shown and described, it will be obvious to those skilled in the art that changes and modifications may be made without departing from this invention in its broader aspects, and, therefore, the aim of the appended claims is to cover all such changes and modifications that fall within the true spirit and scope of this invention.

I claim:

1. A locking device for a telephone receptacle, comprising:

(a) a compartment including a panel having an opening therein, (b) a telephone receptacle mounted upon support means within said compartment, said support means supporting said receptacle away from said panel and in alignment with said opening, (c) a lock having a cylinder mounted at least partially within said compartment, and (d) shutter means pivotally connected to said lock so that when said lock is in a first condition, said shutter means is positioned between said receptacle and said opening, thereby obstructing access to said receptacle through said opening, and when said lock is in a second condition, said shutter means is not positioned between said receptacle and said opening and thereby does not obstruct access to said receptacle through said opening, said shutter means having a bent configuration such that when it is positioned between said receptacle and said opening, a first extremity of said shutter is in close proximity to said opening, and a second extremity of said shutter is connected to said lock in spaced relationship to said panel whereby the cylinder of said lock is positioned between said second extremity and said panel.

2. A locking device for a pool-side telephone jack, comprising:

(a) a compartment including a front panel having an opening therein, (b) a telephone jack mounted upon support means within said compartment, said support means supporting said jack in spacial relationship away from said panel and in alignment with said opening, said opening having a configuration such that a telephone plug can be inserted therethrough and plugged into said jack, (c) a lock having a cylinder mounted upon said panel, and (d) shutter means pivotally connected to the cylinder of said lock so that when said lock is in a first condition, said shutter means is positioned between said jack and said opening, thereby obstructing access to said jack through said opening, and when said lock is in a second condition, said shutter means is not positioned between said jack and said opening and thereby does not obstruct access to said jack through said opening, said shutter means having a Z-type configuration such that when one end of said shutter is positioned between said telephone jack and said opening, that end is in close proximity to said opening, and the other end of said shutter is connected to said lock in spaced relationship to said panel whereby the cylinder of said lock is positioned between said other end and said panel.

References Cited

UNITED STATES PATENTS

| | | | |
|---|---|---|---|
| 103,256 | 5/1870 | Towne | 70—427 |
| 650,556 | 5/1900 | Fischer | 70—427 X |
| 1,713,635 | 5/1929 | Wilson | 70—427 X |

FOREIGN PATENTS

| | | |
|---|---|---|
| 427,664 | 4/1926 | Germany. |

BOBBY R. GAY, *Primary Examiner.*